United States Patent Office 2,755,266
Patented July 17, 1956

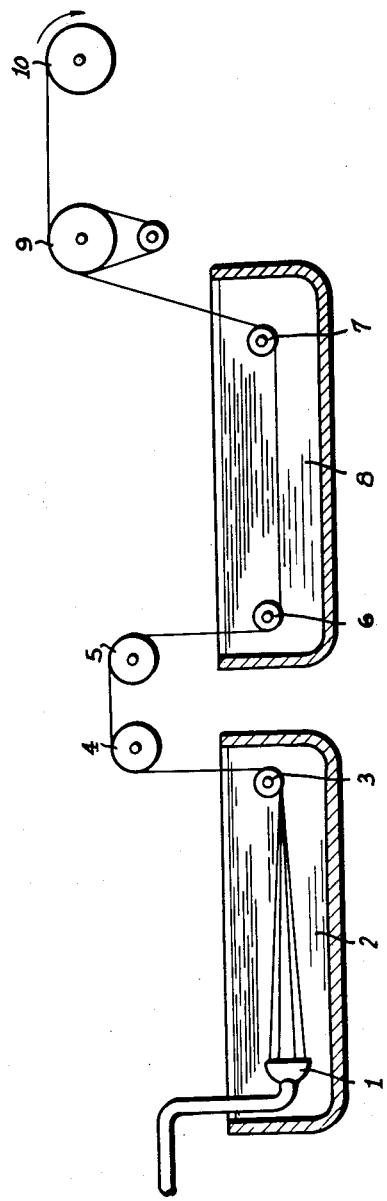

2,755,266

SOLUTIONS OF ELASTOMERS DERIVED FROM ISOCYANATE MODIFIED POLYESTERS

Willy Brenschede, Leverkusen-Bayerwerk, Germany, assignor to Farbenfabriken Bayer Aktiengesellschaft, Leverkusen, Germany, a corporation of Germany Application February 19, 1952, Serial No. 272,527

Claims priority, application Germany February 22, 1951

8 Claims. (Cl. 260—32.6)

The present invention relatees to solutions of polymeric products and more particularly to solutions of elastomers derived from isocyanate modified polyesters.

It has recently been proposed by O. Bayer and co-workers to produce a new class of highly elastic compounds (Angewandte Chemie 62, 57 (1950)) which are prepared by reacting linear polyesters with diisocyanates and subsequent reaction of the resulting diisocyanate modified polyesters containing isocyanate end groups with bifunctional cross-linking agents such as water, dihydroxy compounds (see co-pending application Ser. No. 70,598) or diamines (see co-pending application Ser. No. 144,195, now abandoned). As is shown in the above mentioned Angewandte Chemie article, the linear polyesters which are used may be made by condensing any one of a number of dihydric alcohols with any one of a number of dibasic carboxylic acids. Thus, as dihydric alcohols, one may use, inter alia, ethylene glycol; 1,2-propylene glycol; 2,3-butylene glycol; hexahydroresorcinol; 1,3-butylene glycol; diethylene glycol; glycerine-alpha-monomethyl ether; butenediol; etc. As dibasic acids useful in the invention one may use succinic acid; adipic acid; pimelic acid; sebacic acid; phthalic acid; etc. The mechanical properties of the novel elastomers depend on their mode of manufacture; for instance, their hardness and load at 300% elongation at break may be varied over a fairly wide range.

The object of the present invention is the production of stable solutions of elastomers derived from isocyanate modified polyesters.

Further objects will become apparent as the following description proceeds.

In accordance with the invention it has been found that the above described type of preferably soft elastomers the load of which at 300% elongation at break does not exceed 160 kilogram/cm.$^2$, can be dissolved in the solvents usually employed for polyacrylonitrile, especially dimethyl formamide, dimethyl acetamide, dimethyl propion amide and methoxy dimethyl acetamide. The solutions of said elastomers may be prepared either from the previously condensed end products at temperatures between 20 and 100° C., or by producing the elastomers in the aforesaid solvents. The present invention allows of preparing solutions containing up to 50% of the polymeric product. Furthermore, it is possible according to the invention to prepare pasty mixtures of still higher contents of the elastomers.

The dissolution of the elastomers is accelerated by adding to the solvent small amounts of basic components. Suitable components for this purpose are amines, e. g. dibutylamine or hexahydrodimethylaniline in quantities of 1 per cent or less calculated on the solvent; furthermore, the addition of an alkali in quantities of about 0.01% calculated on the polymeric product already effects an accelerating action on the dissolving process.

The solutions or pastes prepared according to the invention are stable at ordinary temperatures for an indefinite period of time. After removing the solvent, the solutions or pastes may be worked up in known manner to yield highly elastic shaped articles. The mechanical properties of the shaped articles thus obtained are not inferior to those prepared from elastomers which have previously not been dissolved. The process of the invention neither requires the addition of any vulcanization agents, before, during or after the molding process, nor the application of higher temperatures for effecting vulcanization.

According to the invention, it is no longer necessary to work up or to mold isocyanate modified polyesters or solutions thereof, e. g. in methylene chloride, acetone, benzene or toluene immediately after production of said isocyanate modified polyesters or solutions thereof. Furthermore, the incorporation of stabilizers may be omitted, since the invention offers the possibility of preparing from the solid end products of the above described type polymers, stable solutions which may be employed for molding operations at any time. The solutions may be used in known manner for casting films and filaments, for coating fabrics and lining paper, or for spinning filaments and ribbons. It is of advantage to prepare solutions which, as compared with the solutions of other known elastomers such as natural rubber or copolymers produced from butadiene and styrene, show a relatively low viscosity which allows the production of solutions capable of being cast, which contain 50% or a higher percentage of the polymeric product. In this case, the quantities to be evaporated before molding are relatively small. Furthermore, the low viscosity of the solutions is highly convenient in the manufacture of dipped articles in that sometimes one dipping operation will do to obtain a sufficiently strong wall thickness. The solvent can then be removed by dipping the articles in water or glycerol as is more fully set forth in the following paragraph.

The relatively low viscosity of the solutions prepared according to the invention exhibits a favorable influence in the impregnating and coating of paper, fabrics, pressboard goods, leather, and other porous articles, on account of the good penetrating action of the solvent. Furthermore, the solutions may be used as a binder in the manufacture of fibrous fleeces prepared on the base of cellulose, textile fibres, or leather. Further useful fields of application of the new solutions comprise the coating and spraying of natural and synthetic fibres and bristles for the purpose of imparting to said materials specific properties, particularly high elasticity. Moreover, the solutions prepared according to the invention are suited for bonding plastics, textiles, leather, and paper. The bonding of shaped articles, especially oils from the elastic isocyanate modified polyesters may either be performed with a pure solvent or with the solution of the modified polyesters in the solvents of this invention.

The relatively low viscosity of the elastomers in the solvents suitable according to the invention permits of preparing pastes containing 50–80% of the polymeric product; such pastes may be molded under pressure or by the use of a brush to form, for instance, artificial leather. Relatively large quantities of fillers of the most various kind may be incorporated within the pastes containing elastomers. The solvent may be removed from the pastes by evaporation at normal or elevated temperatures, or by treatment with water, glycerol or other liquids which are miscible with said solvents, however, incompatible with the elastomers. Especially in the manufacture of dipped articles the solvent is conveniently removed by the aforesaid treatment with liquids and can then be recovered from the mixtures containing water, glycerol or other liquids by distillation.

Stable solutions of elastomers may further be prepared by carrying out the reactions resulting in the above described type polymeric products (see, for instance, copending application Ser. No. 70,598) in the solvents suitable according to the invention. If concentrations of up to 50% of the polymeric product are desired, solutions are obtained which may be worked up in the same manner as those prepared by dissolving the solid end products. Pasty mixtures containing between 50–80% of the polymeric product are obtained in analogous manner.

Finally, the discovery of the solvents yielding stable solutions of elastomers derived from isocyanate modified polyesters, offers the possibility of compounding said polymeric products with plastics of the most various nature. Such combination products may successfully be employed as lacquer, threads, films, or coatings.

Pastes containing about 50% of the polymeric product, which are prepared by the use of lesser amounts of solvent, may be extruded from a nozzle under pressure at normal or elevated temperatures into filaments or may be molded to yield other shaped articles. The solvent is removed in the same manner as in the operation of thin, liquid mixtures.

One embodiment of the invention which comprises spinning filaments from solutions containing elastomers, is shown in the accompanying drawing by way of example. The filaments are extruded from the spinning nozzles 1 into a glycerol bath 2 heated to 80° C. The bundle of filaments is conveyed over the reversing rollers 3—5 into the water bath 8 which is kept at a temperature of 50° C., where the filaments are liberated from residues of glycerol and the solvent. Thereupon the filaments are wound over a roller 9 on the bobbin 10. The filament is finished by a subsequent drying process at 120° C.

It is a surprising feature that the solvents to be used according to the invention allow to reversibly dissolve and to precipitate the said type elastomers though being of a cross-linked structure, whereas the usual solvents do not show a dissolving and mostly not even a swelling action on the elastomers derived from diisocyanate modified polyesters.

The invention is further illustrated by the following examples without being restricted thereto, the parts given being by weight.

*Example 1*

200 parts of an elastomer prepared from polyethylene glycol adipate having a hydroxyl number of 60, with the addition of 17% of 1.5-naphtylene diisocyanate and 0.8% of water are dissolved in 1800 parts of dimethyl formamide with stirring at 90° C. Foils are prepared from the solution by casting. After removing the solvent by evaporation at 100° C. a foil of 0.35 mm. thickness shows a tensile strength of 410 kilogram/cm.$^2$ at an elongation at break of 820%.

*Example 2*

A mixture consisting of 75 mol per cent of polyethylene glycol adipate and 25 mol per cent of poly-1.2-propylene glycol adipate, both polyesters having the hydroxyl number 57, is worked up to yield an elastomer with the addition of 14% of 1.5-naphthylene diisocyanate and 1% of water. 200 parts of the polymeric product are dissolved in 400 parts of dimethyl acetamide with stirring at 90° C., a clear viscous solution being obtained. Foils and filaments may be prepared from the solution by conventional methods. The mechanical properties of the foils and filaments thus obtained are equal to the articles prepared from non-dissolved elastomers.

*Example 3*

200 parts of an elastomer prepared (according to copending application Ser. No. 102,941, now U. S. Patent 2,620,516) from polyethylene glycol adipate having the hydroxyl number 50, are dissolved in 300 parts of dimethyl formamide with stirring at 50° C. with the addition of 13.0% of 2.4-toluylene diisocyanate and 5.4% of o-dichlorobenzidine as cross-linking agent, a clear solution capable of being cast being thus obtained. To more rapidly remove the solvent, coatings or films cast from the solution are washed with warm water and subsequently dried at 120° C.

*Example 4*

200 parts of the polyester prepared from ethylene glycol and adipic acid having a hydroxyl number of 53, are dissolved in 200 parts of dimethyl formamide and the solution is heated to 130° C. Thereupon 32 parts of 1.5-naphthylene-diisocyanate and subsequently 2 parts of water in mixture with 50 parts of dimethyl formamide are added with stirring. After the evolution of carbon dioxide has ceased a further 550 parts of dimethyl formamide are added to the mixture with stirring. The resultant solution may be used for preparing highly elastic films and filaments in the usual manner.

*Example 5*

200 parts of an elastomer prepared from polyethylene glycol adipate of the hydroxyl number 55 with the addition of 18% of 1.5-naphthylene-diisocyanate and 2% of butylene glycol are dissolved in 600 parts of molten caprolactum at 85° C. Films or foils cast from the solution are washed with warm water to remove the solvent.

Further examples of solvents usually employed for polyacrylonitrile which are suitable according to the invention are those described in U. S. Letters Patents Nos. 2,404,713 to 2,404,728 (16 patents).

I claim:

1. A composition of matter which comprises a solution of an elastomer prepared by reacting linear polyesters containing terminal hydroxyl groups and prepared from polycarboxylic acids and polyhydric alcohols with an excess of diisocyanate over the terminal hydroxyl groups of the polyesters and subsequent reaction of the resulting diisocyanate-modified polyester containing isocyanate end groups with bifunctional cross-linking agents selected from the group consisting of water, dihydroxy compounds and diamines in a solvent consisting of at least one dimethyl carbamyl compound capable of forming solutions of polyacrylic nitriles.

2. A composition of matter which comprises a solution of an elastomer prepared by reacting linear polyesters containing terminal hydroxyl groups and prepared from polycarboxylic acids and polyhydric alcohols with an excess of diisocyanate over the terminal hydroxyl groups of the polyesters and subsequent reaction of the resulting diisocyanate-modified polyester containing isocyanate end groups with bifunctional cross-linking agents selected from the group consisting of water, dihydroxy compounds and diamines in at least one solvent selected from the group consisting of dimethyl formamide, dimethyl acetamide, dimethyl propionamide and methoxy dimethyl acetamide.

3. A composition of matter which comprises a solution of an elastomer prepared by reacting linear polyesters containing terminal hydroxyl groups and prepared from polycarboxylic acids and polyhydric alcohols with an excess of diisocyanate over the terminal hydroxyl groups of the polyesters and subsequent reaction of the resulting diisocyanate-modified polyester containing isocyanate end groups with bifunctional cross-linking agents selected from the group consisting of water, dihydroxy compounds and diamines in a solvent consisting of at least one dimethyl carbamyl compound capable of forming solutions of polyacrylic nitriles, said solvent containing about 0.01% to 1% calculated on the polymeric product, of an amine.

4. A composition of matter which comprises a solution of an elastomer prepared by reacting linear polyesters containing terminal hydroxyl groups and prepared from polycarboxylic acids and polyhydric alcohols with an excess of diisocyanate over the terminal hydroxyl groups of the polyesters and subsequent reaction of the resulting diisocyanate-modified polyester containing isocyanate end groups with bifunctional cross-linking agents selected from the group consisting of water, dihydroxy compounds and diamines in at least one solvent selected from the group consisting of dimethyl formamide, dimethyl acetamide, dimethyl propionamide and methoxy dimethyl acetamide, said solvent containing about 0.01% to 1% calculated on the polymeric product, of an amine.

5. The composition of claim 3 wherein the amine is dibutylamine.

6. The composition of claim 3 wherein the amine is hexahydro dimethyl aniline.

7. The composition of claim 4 wherein the amine is dibutylamine.

8. The composition of claim 4 wherein the amine is hexahydro dimethyl aniline.

References Cited in the file of this patent

Ser. No. 397,741, Schlack (A. P. C.), published April 20, 1943.